(12) United States Patent  (10) Patent No.: US 7,949,663 B1
Cassone et al.  (45) Date of Patent: May 24, 2011

(54) ENHANCED PROJECT PREDICTOR

(75) Inventors: Deandra T. Cassone, Overland Park, KS (US); Joseph E. Dudley, Overland Park, KS (US); George R. Kather, Leavenworth, KS (US); Paul R. Sapenaro, Overland Park, KS (US); Jason N. Ward, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1132 days.

(21) Appl. No.: 11/672,905

(22) Filed: Feb. 8, 2007

Related U.S. Application Data (63) Continuation-in-part of application No. 11/467,226, filed on Aug. 25, 2006, now Pat. No. 7,676,490.

(51) Int. Cl.
*G06F 17/30* (2006.01)
*G06F 15/16* (2006.01)

(52) U.S. Cl. .................. 707/750; 705/306; 705/400

(58) Field of Classification Search .................. 707/600, 707/750, 999.01–999.206; 705/7, 10, 37, 705/306, 400
See application file for complete search history.

(56) References Cited

U.S. PATENT DOCUMENTS

| | | | |
|---|---|---|---|
| 5,189,606 A * | 2/1993 | Burns et al. ..................... | 705/10 |
| 5,798,950 A * | 8/1998 | Fitzgerald ....................... | 703/17 |
| 5,815,638 A * | 9/1998 | Lenz et al. ...................... | 706/15 |
| 5,918,219 A * | 6/1999 | Isherwood ...................... | 705/37 |
| 7,139,999 B2 | 11/2006 | Bowman-Amuah | |
| 7,676,490 B1 | 3/2010 | Cassone et al. | |
| 2002/0174005 A1* | 11/2002 | Chappel .......................... | 705/10 |
| 2004/0054568 A1* | 3/2004 | Bradley et al. .................... | 705/7 |
| 2004/0111306 A1 | 6/2004 | Yokota et al. | |
| 2004/0249779 A1* | 12/2004 | Nauck et al. ..................... | 706/47 |
| 2005/0065826 A1* | 3/2005 | Baker et al. ........................ | 705/7 |
| 2005/0289503 A1* | 12/2005 | Clifford ........................ | 717/101 |
| 2006/0044307 A1* | 3/2006 | Song ............................. | 345/419 |
| 2006/0235732 A1 | 10/2006 | Miller et al. | |

OTHER PUBLICATIONS

Alsup, Lance A., et al., Patent Application entitled, "Project Estimator", filed Jul. 21, 2006, U.S. Appl. No. 11/491,203.
Cassone, Deandra, et al., Patent Application entitled, "Project Predictor", filed Aug. 25, 2006, U.S. Appl. No. 11/467,226.
Berenson, Mark L., et al., "Basic Business Statistics: Concepts and Applications," Upper Saddle River, N.J., Pearson/Prentice Hall, 2005, 8th Edition. pp. 550-633.
Notice of Allowance dated Oct. 23, 2009, U.S. Appl. No. 11/467,226, 4 pgs.
Armour, Phillip, "Ten Unmyths of Project Estimation," Communications of the ACM, Nov. 2002, vol. 45. No. 11, 4 pgs.
Office Action dated Jun. 8, 2010, U.S. Appl. No. 11/491,203, filed Jul. 21, 2006, 39 pgs.

(Continued)

*Primary Examiner* — Tony Mahmoudi
*Assistant Examiner* — Dennis Truong (57) ABSTRACT

A computer implemented system for project prediction is provided. The system includes a data manager to obtain historical project data. The system also includes an analyzer to analyze the historical project data and an analysis cycle time to generate models for a proposed project cycle time. Additionally, the system includes a user interface to select one model for the proposed project cycle time, wherein the selected model includes linear sub-models corresponding to a historical data range, and apply proposed project data and analysis cycle time to one linear sub-model corresponding to a proposed data range to predict the proposed project cycle time. Furthermore, the system captures proposed project data and obtains additional project data to update the selected model. The models provide for the accurate prediction of cycle times, or project costs, in an enterprise development environment.

20 Claims, 7 Drawing Sheets

OTHER PUBLICATIONS

Briand, Lionel C., et al., "Using Multiple Adaptive Regression Splines to Support Decision Making in Code Inspections," Feb. 28, 2004, 13 pgs.
Pre-Interview First Office Action dated Jul. 3, 2008, U.S. Appl. No. 11/467,226, 6 pgs.
First Action Interview—Office Action dated Oct. 27, 2008, U.S. Appl. No. 11/467,226, 7 pgs.
Final Office Action dated Apr. 1, 2009, U.S. Appl. No. 11/467,226, 35 pgs.
Office Action dated Jun. 11, 2009, U.S. Appl. No. 11/467,226, 4 pgs.
Final Office Action dated Oct. 27, 2010, U.S. Appl. No. 11/491,203, filed Jul. 21, 2006.
Advisory Action dated Jan. 6, 2011, U.S. Appl. No. 11/491,203 filed on Jul. 21, 2006.

* cited by examiner

ENHANCED PROJECT PREDICTOR

CROSS-REFERENCE TO RELATED APPLICATIONS

This is a Continuation in Part Application claiming priority to U.S. patent application Ser. No. 11/467,226, filed Aug. 25, 2006 and entitled "Project Predictor," which is incorporated by reference herein in its entirety.

This application includes subject matter related to the following application, which is hereby incorporated by reference: U.S. patent application Ser. No. 11/491,203, filed Jul. 21, 2006, entitled "Project Estimator," by Lance Alsup, et al.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A business enterprise can pursue many projects at any given time. The enterprise may need to allocate a significant amount of resources to each project during the project's cycle time, the time from the start of the project to the time at the completion of the project. Accurately predicting both the amount of resources required for the project and the cycle time for the project enables the enterprise to plan the allocation of resources over the cycle time. However, the cycle time and the amount of resources required for any project can be difficult to accurately predict during the initial stages of the project due to the differing nature of each project.

SUMMARY

In one embodiment, a computer implemented system for enhanced project prediction is provided. The system includes a data manager to obtain historical project data. The system also includes an analyzer to analyze the historical project data to generate models for a proposed project cycle time. Additionally, the system includes a user interface to select one model for the proposed project cycle time, wherein the selected model includes linear sub-models corresponding to historical data ranges, and apply proposed project data and an analysis cycle time to one linear sub-model corresponding to a proposed data range to predict the proposed project cycle time.

In another embodiment, a computer implemented method for enhanced project prediction is provided. Historical project data is obtained. The historical project data is analyzed to generate models for a proposed project cost. One model is selected for the proposed project cost, wherein the selected model includes distinct linear sub-models corresponding to distinct historical data ranges. Proposed project data and an analysis cycle time are applied to one distinct linear sub-model corresponding to a proposed data range to predict the proposed project cost. Additional project data is obtained to update the selected model.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 3 shows an illustrative user interface according to some embodiments of the present disclosure.

DETAILED DESCRIPTION

It should be understood at the outset that although implementations of various embodiments of the present disclosure are described below, the present system may be implemented using any number of techniques, whether currently known or in existence. The present disclosure should in no way be limited to the implementations, drawings, and techniques described below, but may be modified within the scope of the appended claims along with their full scope of equivalents.

Some embodiments of the present disclosure provide a project predictor to predict a cycle time for a proposed project, while other embodiments of the present disclosure provide a project predictor to predict a cost for a proposed project. The project predictor embodiments employ one or more predictive models that include linear sub-models corresponding to historical data ranges. For example, a predictive model can be divided into linear sub-models based on estimated project costs, with a linear sub-model corresponding to each range identified for estimated project costs. Predictive models for a project can be based on estimated costs for the project, the amount of time that project analysis required, a selected testing plan, and organization participation in the project. For projects with estimated costs greater than a specified amount, the predictive models can also be based on the number of applications affected. For projects with estimated costs less than a specified amount, the predictive models can also be based on the pre-existing project status.

In some embodiments the linear sub-models and the data ranges are distinct, while in other embodiments the linear sub-models and the data ranges are overlapping. If an insufficient amount of historical data exists for a prediction based on distinct sub-models and distinct data ranges, the prediction can be based on overlapping sub-models and overlapping data ranges. The use of multiple sub-models enables the predictor to accurately identify and model the regions of divergent behavior for different project types. In some of the embodiments of the present disclosure, the predictor captures the data submitted for making predictions and uses it to refine the predictive models. The project predictor can analyze historical data to generate models that include sub-models based on data ranges, and apply proposed project data to the sub-models to predict either a cycle time for a proposed project or a cost for the proposed project.

A project is a temporary endeavor undertaken to create a unique service or product, such as computer software. The cycle time for a project can include a number of phases, such as a concept phase, an analysis phase, a design phase, a development phase, a test phase, and a launch phase.

A test plan is often required for executing the test phase for a project. A test plan for the project can be selected during the analysis phase of the project. The longer that the selected test plan requires for completion, the longer the cycle time or the greater the cost predicted for the project. Testing plans can include alpha testing, alpha testing and beta testing, or flashcut testing.

Alpha testing is simulated operational testing in the production environment after deployment of the project to the production environment to ensure that project requirements have been met and that the project functions as expected. The project developers determine the scope of alpha testing based on project needs. The project product or application is isolated from the current or anticipated customer base during the alpha test. Alpha testing can be conducted by internal customers, the project developers, and/or an independent test team at the site of the project developers. Alpha testing is often employed as a form of internal acceptance testing before the project goes to beta testing. However, a test plan can select alpha testing without also selecting beta testing.

Beta testing is a controlled test in the production environment of project functionality under actual usage conditions with selected live customers to ensure that the project functions properly, the project meets project requirements, and to identify and correct customer impacting issues prior to project launch. The project developers determine the scope of beta testing based on project needs. Ideally, the project product or application is isolated from the current or anticipated customer base during the beta test. Versions of the project, known as beta versions, are released to a selected audience of contracted customers outside of the enterprise. The software is released to these friendly users so that testing beyond alpha testing can reduce faults or bugs.

Flashcut testing is a test in the production environment of project functionality under actual usage conditions with the current or anticipated customer base to ensure that the project functions properly, the project meets project requirements, and to identify and correct customer impacting issues after the launch phase. In contrast to the internal alpha testing or the limited external beta testing, flashcut testing occurs after the launch phase. The project is released to all users so that testing after the project launch can reduce the faults or bugs.

Figure 1:
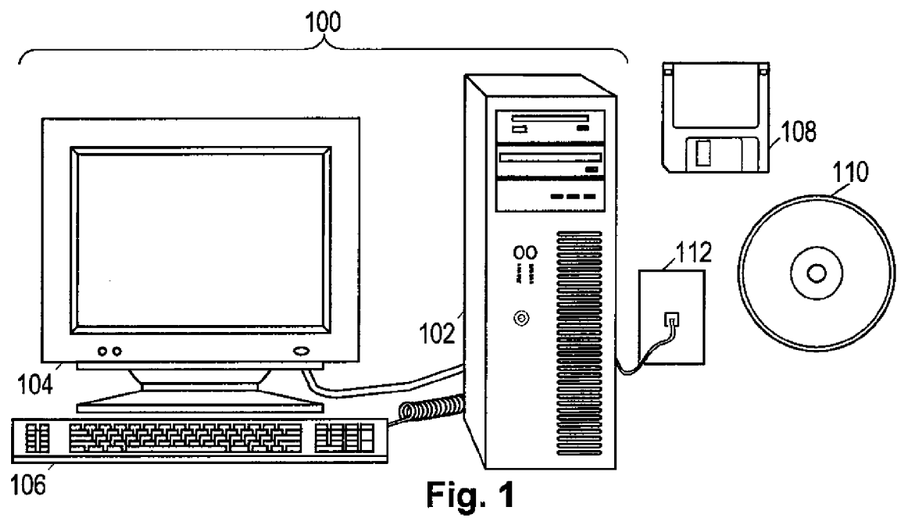
FIG. 1 shows an illustrative enhanced project predictor embodied as a desktop computer.

FIG. 1 shows an illustrative enhanced project predictor system 100. The project predictor system 100 is shown as a desktop computer 100, although any electronic device having some amount of computing power coupled to a user interface may be configured to carry out the methods disclosed herein. Among other things, servers, portable computers, personal digital assistants (PDAs) and mobile phones may be configured to carry out aspects of the disclosed methods.

As shown, the project predictor system 100 comprises a chassis 102, a display 104, and an input device 106. The chassis 102 comprises a processor, memory, and information storage devices. One or more of the information storage devices may store programs and data for project prediction on removable storage media such as a floppy disk 108 or an optical disc 110. The chassis 102 may further comprise a network interface that allows the system 100 to receive information via a wired or wireless network, represented in FIG. 1 by a phone jack 112, information such as project predictor software and historical project data.

The chassis 102 is coupled to the display 104 and the input device 106 to interact with a user. The display 104 and the input device 106 together operate as a user interface for enabling a user to predict project costs and durations. The display 104 is shown as a video monitor, but may take many alternative forms such as a printer, a speaker, or other means for communicating information to a user, information such as linear sub-models. The input device 106 is shown as a keyboard, but may similarly take many alternative forms such as a button, a mouse, a keypad, a dial, a motion sensor, a camera, a microphone or other means for receiving information from a user, information such as proposed project data. Both the display 104 and the input device 106 may be integrated into the chassis 102.

Figure 2:
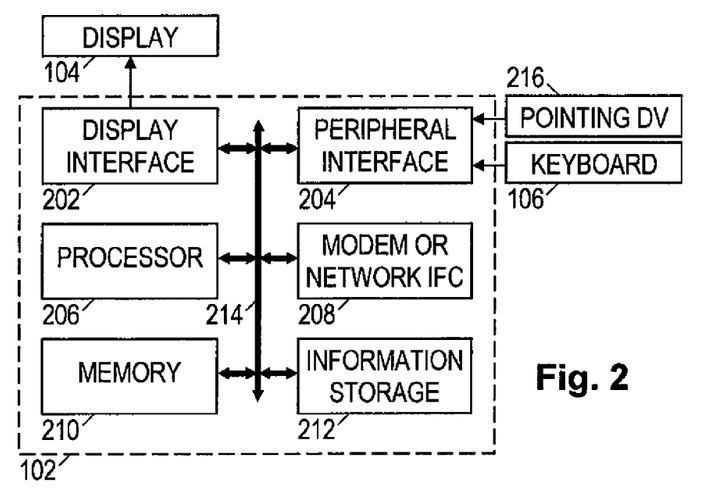
FIG. 2 shows a block diagram of an illustrative enhanced project predictor system.

FIG. 2 shows a simplified functional block diagram of the project predictor system 100. The chassis 102 may comprise a display interface 202, a peripheral interface 204, a processor 206, a modem or other suitable network interface 208, a memory 210, an information storage device 212, and a bus 214. The project predictor system 100 may be a bus-based computer, with the bus 214 interconnecting the other elements and carrying communications between them. The display interface 202 may take the form of a video card or other suitable display interface that accepts information from the bus 214 and transforms it into a form suitable for the display 104. Conversely, the peripheral interface 204 may accept signals from the keyboard 106 and other input devices such as a pointing device 216, and transform them into a form suitable for communication on the bus 214.

To carry out the project prediction methods disclosed herein, the processor 206 gathers information from other system elements, including input data from the peripheral interface 204, and program instructions and other data from the memory 210, the information storage device 212, or from a remote location via the network interface 208. The processor 206 carries out the program instructions and processes the data accordingly. The program instructions may further configure the processor 206 to send data to other system elements, including information for the user which may be communicated via the display interface 202 and the display 104.

The processor 206, and hence the project predictor system 100 as a whole, operates in accordance with one or more programs stored on the information storage device 212. The processor 206 may copy portions of the programs into the memory 210 for faster access, and may switch between programs or carry out additional programs in response to user actuation of the input device. The additional programs may be retrieved from the information storage device 212 or may be retrieved from remote locations via the network interface 208. One or more of these programs configures the system 100 to carry out at least one of the enhanced project predictor methods disclosed herein.

Turning now to FIG. 3, an illustrative user interface 300 for an enhanced project predictor is depicted. The user interface 300 includes entry fields for a user to enter input 302 to predict either the cycle time or the cost for a proposed project, such as an enterprise software project. Alternatively, the user interface 300 may include entry fields for a user to enter similar information for a previous, or historical, project. The input entry fields are shown for the purpose of an illustrative example only, as the user interface 300 can include any number of entry fields for various types of input data. The input 302 entry fields are selected based on a record of historical projects, which can include similar estimates and inputs for the historical projects along with the cycle times and the costs for historical projects. The information for the historical projects can be entered after those projects have been completed, but in some embodiments, the information is entered before or during the project and supplemented after the project has been completed. The input entry fields can include entry fields to indicate whether a project is a grandfathered project 304, to indicate a major or minor project 306, to indicate a number of applications 308 affected by the project, to indicate estimated costs 310, and to indicate affected organizations 312. In various embodiments, information entered into any entry field can be a factor in estimating the cycle time or the cost for the proposed project.

The grandfathered project 304 entry field is for the user to enter a project status to indicate whether a proposed project existed prior to a given date and hence was developed under different guidelines. The major or minor 306 entry field is for the user to enter the software release type typically dictated by the size of the project. The number of applications 308 entry field is for the user to enter an estimated number of applications that will be affected by the proposed project.

The illustrative costs 310 entry fields include an information technology internal labor 314 entry field, an information technology vendor labor 316 entry field, and a total project costs 318 output. As an example, the user estimates the information technology internal labor 314 entry as $247,792 and estimates the information technology vendor labor 316 entry as $0. Further to this example, the total project costs 318 output displays an estimated total project cost of $247,792. Furthermore, the input 302 entry fields, including initial estimated costs entries, can be factors in estimating a more accurate total cost or cycle time for the proposed project using embodiments of the present disclosure.

The illustrative organizations 312 entry fields include a set of organization 320 entry fields, such as entry fields for a network organization, a business marketing organization, a business sales organization, an other organization, a corporate security organization, an EPMO project manager organization, a finance organization, an IT billing organization, an IT organization, and a total organizations. In FIG. 3, each of these organizations listed are organizations participating in the proposed project. Some embodiments of the present disclosure estimate a more accurate cost for a proposed project, and allocate the estimated costs to the organizations participating in the proposed project.

The input entry fields can also include an actual analysis cycle time 322 entry field to use as a factor in estimating the cycle time or the cost for the proposed project. After the analysis phase of the project is completed, the actual analysis cycle time 322 entry field can be entered. The user enters the actual analysis cycle time, the amount of time that project analysis required, as a factor in estimating the cycle time or the cost for the proposed project. Projects that eventually require a long cycle time to complete also tend to require a long cycle time for analysis, as more complicated projects tend to require both a longer time to complete and a longer time to analyze, whereas projects that eventually require a short cycle time to complete also tend to require a shorter cycle time to analyze. Furthermore, a longer analysis cycle time can indicate the need for additional analysis to determine the reasons for the longer analysis cycle time. Project inefficiencies can be one of the reasons for the longer analysis cycle time, such that addressing the project inefficiencies can improve the eventual project cycle time.

The input 302 entry fields can also include a proposed test plan for a project to use as a factor in estimating the cycle time or the cost for the proposed project, such as a project plan 324 specified by an alpha testing entry field, a beta testing entry field, and a flashcut testing entry field.

If a user enters input 302 to predict the cycle time for a proposed project, the user interface 300 includes a predicted cycle time 326. Embodiments of the present disclosure generate the predicted cycle time 326 by applying the entered input 302 to a selected model based on historical project data. When the user enters input 302 to predict the cost for a proposed project, the user interface 300 can provide a predicted cost. Alternatively, the user can enter historical data for a previous project along with actual cost and cycle time information.

Figure 4:
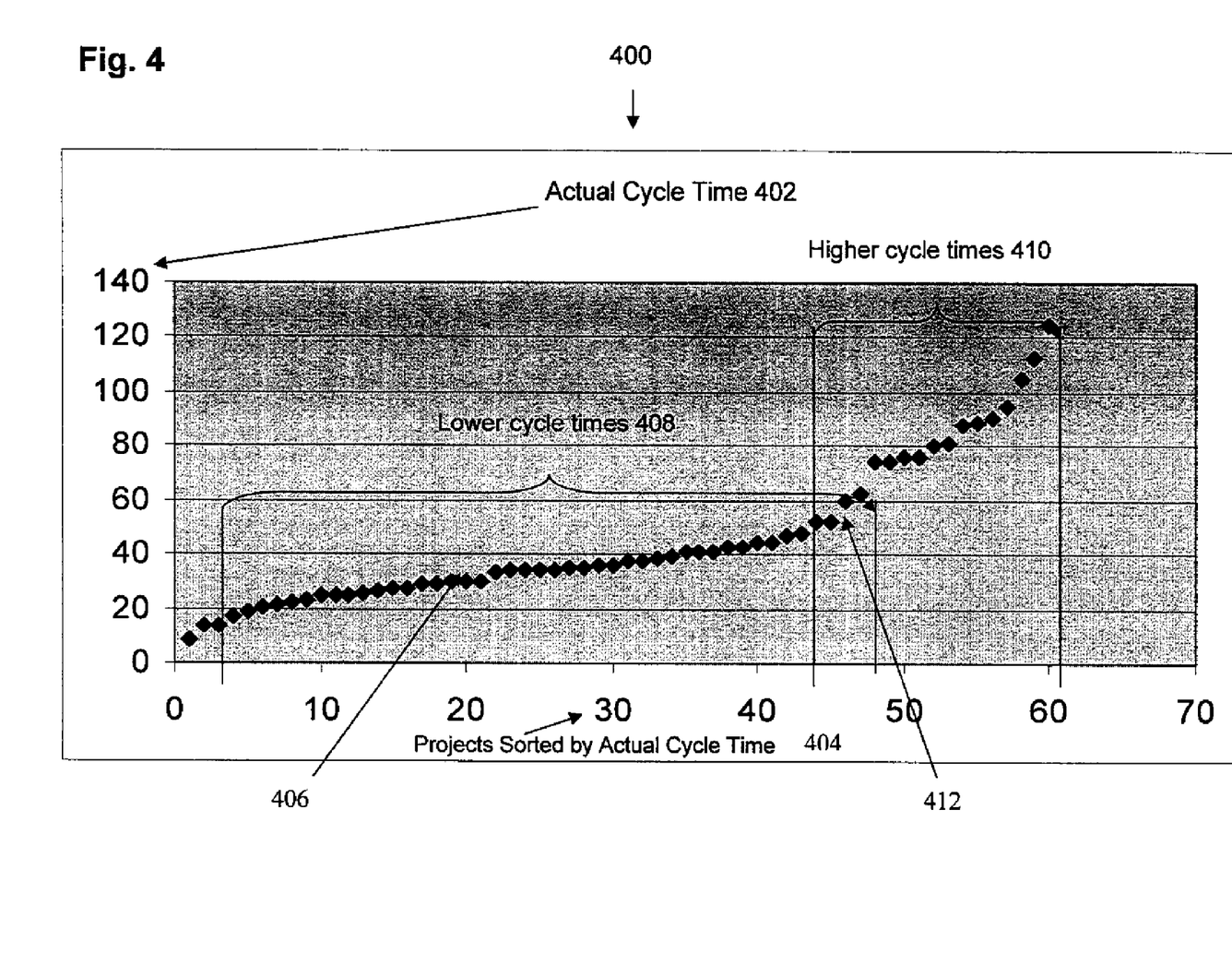
FIG. 4 shows an illustrative project data graph according to some embodiments of the present disclosure.

FIG. 4 shows an illustrative data graph 400 for projects according to some embodiments of the present disclosure. The data graph 400 depicts actual cycle time 402 for historical project data on the vertical axis and historical projects sorted by actual cycle time 404 on the horizontal axis. For example, when historical projects are sorted by actual cycle time from the historical project with the smallest actual cycle time to the historical project with the largest actual cycle time, a data point 406 represents that the historical project with the 19$^{th}$ smallest actual cycle time had an actual cycle time of 31 weeks.

The data graph 400 depicts that lower cycle times 408 increase gradually from historical project to historical project, in contrast to higher cycle times 410, which increases sharply from historical project to historical project. The data graph 400 includes two contrasting ranges, lower cycle times 408 and higher cycle times 410, for the purpose of an example only, as the data graph 400 can include any number of contrasting ranges. The contrast between the lower cycle times 408 and the higher cycle times 410 can indicate a difference in the nature of the historical projects, which can be identified by measuring and comparing the average increase between actual cycle times for successive historical projects. The transition between historical projects with differing natures is approximated as occurring at a transition data point 412. Research into characteristics of historical projects with the higher cycle times 410 can identify differences from characteristics of historical projects with the lower cycle times 408. The transition data point 412 can be based on an absolute value, such as the total project cost of one and a half million dollars, or relative values, such as 80% of the maximum estimate for the total project cost, or 10% greater than the median project cost. For example, the total project cost for almost all of the historical projects with the higher cycle times 410 is greater than one and a half million dollars, whereas the total project cost for almost all of the historical projects with the lower cycle times 408 is less than one and a half million dollars.

An identified difference in a characteristic between the historical projects with the higher cycle times 410 and the historical projects with the lower cycle times 408 can serve as the basis for generating sub-models divided at the transition data point 412 instead of generating a single model to approximate actual cycle time. For example, analysis of the projects reveals that the projects above a specific transition data point generally have a total predicted project cost greater than a specified amount, and projects below the transition data point generally have a predicted total project cost less than the specified amount. As a specific example, the projects above transition data point 412 generally have a total predicted project cost greater than one and a half million dollars, and projects below transition data point 412 generally have a predicted total project cost less than one and a half million dollars. Hence different sub-models can be generated from the historical projects in these different data ranges.

For example, instead of analyzing all of the historical data for historical projects to generate a model for a proposed project, the proposed project data is compared to the different data ranges for the historical projects. Continuing this example, because the predicted total project cost for the proposed project is less than one and a half million dollars, only the historical data for historical projects that had a predicted total project cost less than one and a half million dollars is analyzed to generate a sub-model for the proposed project.

The sub-models and the corresponding data ranges can be distinct or overlapping. If an insufficient amount of historical projects exist for a prediction based on distinct sub-models and distinct data ranges, the prediction can be based on overlapping sub-models and overlapping data ranges. For example, if only a few historical projects are in the data range with the higher cycle times 410, the enhanced project predictor can generate the predicted cycle time for a project using an overlapping sub-model based on an overlapping data range, the data range that includes both the lower cycle times 408 and the higher cycle times 410. However, if a significant number of historical projects are in the data range with the lower cycle times 408, the enhanced project predictor can still generate the predicted cycle time for a project using a distinct sub-model based on a distinct data range, the data range that includes only the lower cycle times 408.

Figure 5:
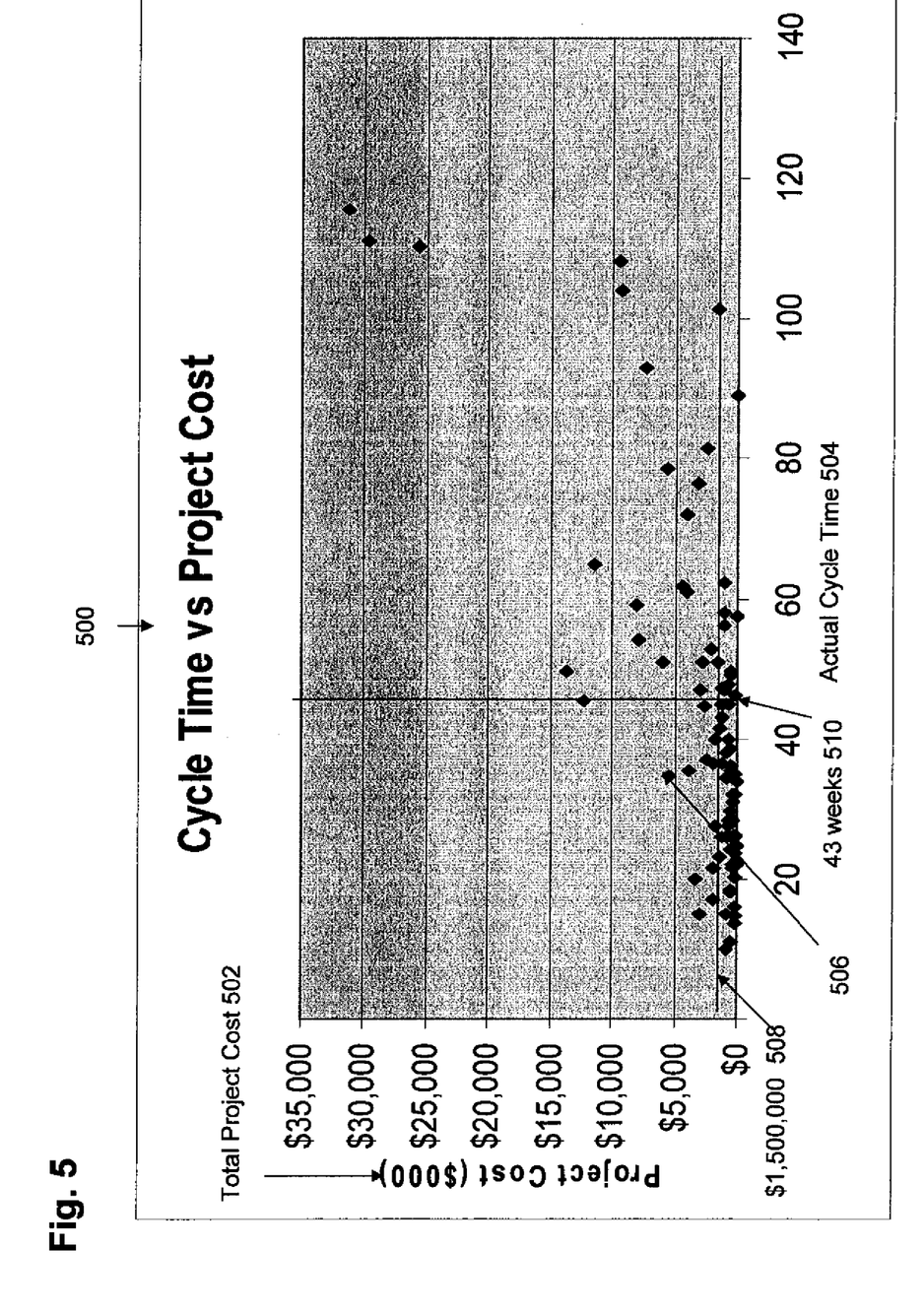
FIG. 5 shows an illustrative enhanced project predictor data graph according to some embodiments of the present disclosure.

FIG. 5 shows an illustrative data graph 500 for an enhanced project predictor according to some embodiments of the present disclosure. The data graph 500 depicts total project cost 502 for historical project data on the vertical axis and actual cycle time 504 for historical projects on the horizontal axis. For example, when historical projects are depicted by predicted total cost and actual cycle time, a data point 506 represents that a historical project that had a predicted total cost of $5,200,000 required 36 weeks of actual cycle time to complete.

The vast majority of the projects graphed in the data graph 500 have an actual cycle time 504 less than 60 weeks. The data graph 500 depicts that the vast majority of the historical projects with a total project cost greater than one and a half million dollars 508 have higher cycle times than the average cycle time of 43 weeks 510, whereas the vast majority of the historical projects with a total project cost less than one and a half million dollars 508 have lower cycle times than the average cycle time of 43 weeks 510.

Figure 6:
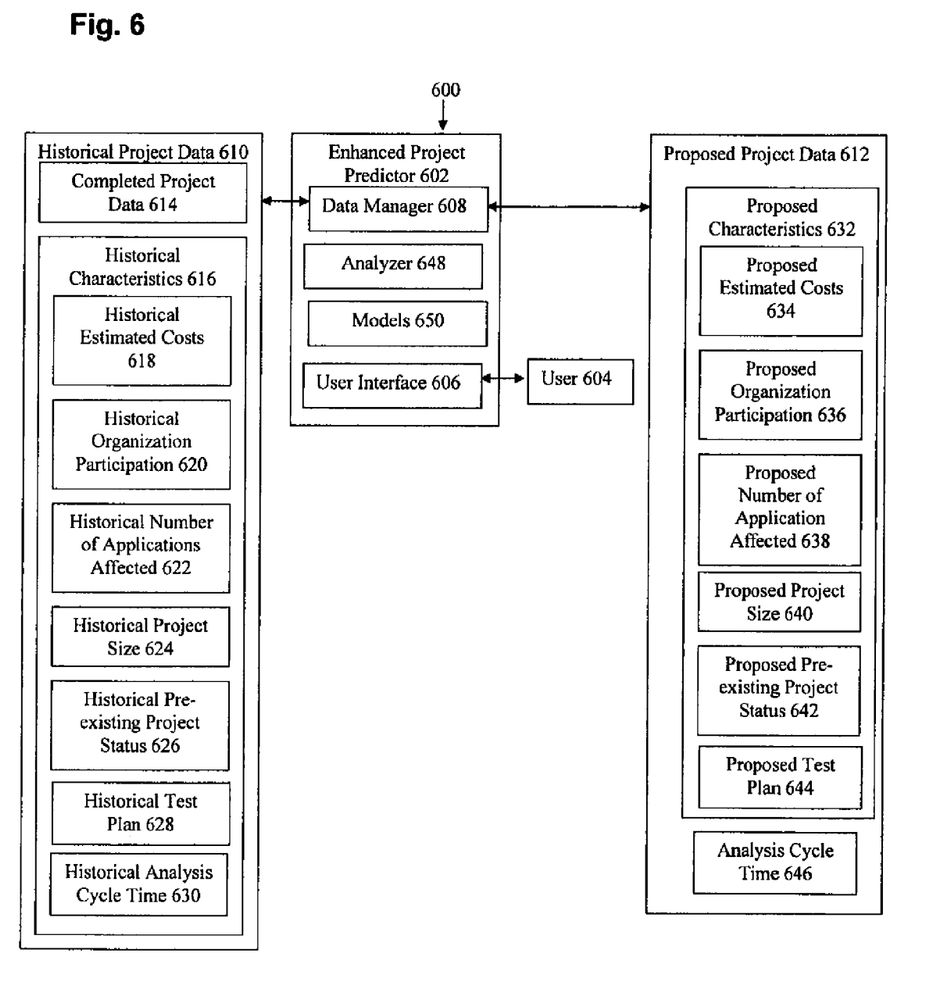
FIG. 6 shows illustrative software architecture for an enhanced project predictor according to some embodiments of the present disclosure.

FIG. 6 shows illustrative software architecture 600 for an enhanced project predictor 602 according to an embodiment of the present disclosure. The enhanced project predictor 602 interacts with a user 604 through a user interface 606. The enhanced project predictor 602 can include a data manager 608, which can either interact with or include databases of historical project data 610 and proposed project data 612. The data manager 608 can obtain the historical project data 610 and the proposed project data 612 or the user 604 can utilize the user interface 606 to enter the historical project data 610 and the proposed project data 612 into the data manager 608.

The historical project data 610 includes information for previous projects, such as completed project data 614, which can include the actual amount of time and cost required to complete each historical project, and other historical characteristics 616. The historical characteristics 616 can include historical estimated costs 618, historical organization participation 620, historical number of applications affected 622, historical project size 624, historical pre-existing project status 626, historical test plan 628, and historical analysis cycle time 630. Similarly, the proposed project data 612 can include proposed characteristics 632, which can include proposed estimated costs 634, proposed organization participation 636, proposed number of applications affected 638, proposed project size 640, proposed pre-existing project status 642, proposed test plan 644, and proposed analysis cycle time 646. Characteristics of projects are discussed in more detail above in reference to FIG. 3, which depicts an example of the user interface 300 for entering examples of characteristics, such as the estimated costs 310, the organization participation 312, the actual analysis cycle time 322, the number of applications 308, the major or minor project size 306, the pre-existing project status 304, and the testing plan 324.

The enhanced project predictor 602 can use an analyzer 648 to analyze the relationship between the completed project data 614 and the historical characteristics 616 to generate models 650 of the relationships between the completed project data 614 and the historical characteristics 616. If the user 604 is an administrator, the user 604 can configure the user interface 606 and sets up the models 650. If the user 604 is a manager, the user 604 can enter historical project data 610, utilize the user interface 606 to view performance graphs, select one model of the models 650, and apply the proposed characteristics 632 to the model to predict either a cycle time or a cost for a proposed project. Although depicted in FIG. 6 as separate components, any features and capabilities of the user interface 606, the data manager 608, the historical project data 610, the proposed project data 612, and the analyzer 648 can be combined or integrated in any combination.

Figure 7:
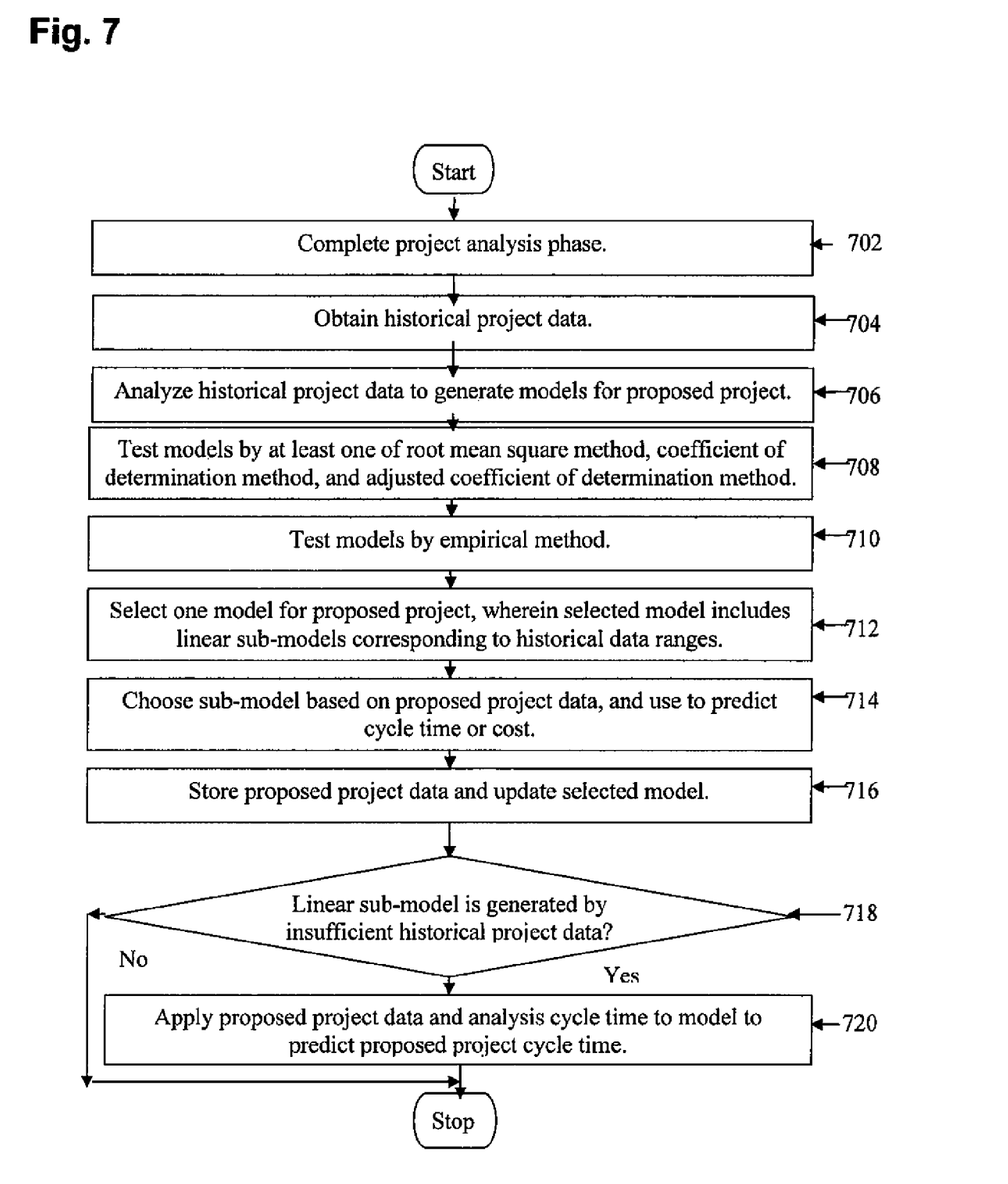
FIG. 7 shows an illustrative enhanced project predictor method according to some embodiments of the present disclosure.

FIG. 7 shows an illustrative enhanced project predictor method according to an embodiment of the present disclosure. Applying this method results in generating a model, which can comprise multiple linear sub-models, and predicting either a cycle time or a cost for a proposed project.

In box 702, a project analysis phase is completed. For example, following the completion of a concept phase and preceding the start of the development phase, the project analysis phase is completed, during which a testing plan is selected. The amount of time required to complete the project analysis phase is identified as the actual analysis cycle time for the project.

In box 704, historical project data is obtained. For example, the data manager 608 obtains the historical project data 610, which can include the historical characteristics 616 and the completed project data 614, which can include historical cycle times and historical costs.

In box 706, the historical project data is analyzed to generate models for a proposed project. For example, one way that the analyzer 648 can analyze the historical project data to generate models for a proposed project is by applying multiple regression analysis to the historical project data. Continuing this example, the analyzer 648 analyzes the relationships between the completed project data 614, which can be historical cycle times or historical costs, and the historical characteristics 616 to generate models for a proposed project by applying multiple regression analysis.

Details on multiple regression analysis can be found in Berenson, M. L., Krehbiel, T. C., and Levine, D. M., Basic Business Statistics: Concepts and Applications. Upper Saddle River, N.J., Pearson/Prentice Hall, 2005, 8th Edition. p. 550-633. HF1017.B38 2001. In statistics, regression analysis can be used to generate models for the relationships between variables, such as the completed project data 614 and the historical characteristics 616, determine the magnitude of the relationships between the variables for each model, and make predictions based on the models. Multiple regression analysis refers to analysis of a regression on more than two variables. Multiple regression analysis can begin with a set of all the potentially relevant variables and eliminate variables from the set of variables, based on a statistical significance test. The statistical significance test can analyze whether eliminating a specific variable resulted in a significant change in the predicted value for a model. This analysis can determine whether the specific variable is included or excluded from the model. The statistical significance test then repeats the analysis with a subset of the variables. The statistical significance test can also test the results of adding a previously excluded variable back into the set of variables used for the model.

Multiple regression analysis can include linear regression analysis, which assumes the best estimate is a model based on a linear function of some variables or a combination of linear sub-models based on linear functions of some variables. A linear function represents a straight line in Cartesian coordinates. If either a transition data point is identified for a model, such as the transition data point 412 in FIG. 4, or multiple transition data points are identified for a model, multiple regression analysis can result in the generation of multiple sub-models instead of the generation of a single model. The generated sub-models can be distinct, sharing no points in common, or overlapping, sharing a number of points in common.

Multiple regression analysis can result in calculating a parameter value for each variable included in the model. Variables not included in the model have an implied parameter of zero. The predicted value for each data point in the model can be calculated by multiplying each variable for a data point by the corresponding parameter for the variable and then summing the products of each multiplication. Often a baseline offset is also added. A model can be based on an estimated total project cost 318 and the organizations 312 entry fields. For example, a model based on an estimation for the total project costs 318 that is greater than a specified cost can also be based upon the number of applications affected 308 entry field. The identified number of projects affected represented by number of applications affected 308 entry field can further differentiate levels of complexity between the projects estimated to be more expensive. In contrast, a model based on an estimated total project cost 318 that is less than a specified cost can also be based upon the grandfathered project 304 entry field. The grandfathered project status can be a factor that impacts the projects estimated to be less expensive, but not the projects estimated to be more expensive. The magnitude of affect due to the grandfathered project status can be relatively minimal when compared to the cycle times and expenses for the projects estimated to be more expensive.

Embodiments of the present disclosure can analyze historical project data to generate models for a proposed project before the project analysis phase and after the project analysis phase. Models generated before the project analysis phase can be used to estimate either cycle time or cost for a project that has not yet entered the project analysis phase. Following the project analysis phase, additional models incorporating the analysis cycle time can be generated to more accurately estimate either the cycle time or costs for the project.

As a specific example of a pre-analysis phase model based on an estimated total project cost 318 that is greater than a specified cost, a linear sub-model can be based on multiplying the following variables by their corresponding parameter values and summing the products. A receivables management entry field is multiplied by −17.23837, the total project costs 318 output is multiplied by 0.00000411, the number of applications 308 entry field is multiplied by 0.26458, a subscriber equipment business unit organization entry field is multiplied by 0.8547, the alpha testing entry field is multiplied by 25.19986, and other variables are multiplied by 0. Continuing the example, the pre-analysis phase model estimates 80 weeks of cycle time for the project.

As a specific example of a post-analysis phase model based on an estimated total project cost 318 that is greater than a specified cost, a linear sub-model can be based on multiplying the following variables by their corresponding parameter values and summing the products. A receivables management entry field is multiplied by −15.26319, the total project costs 318 output is multiplied by 0.00000359, the number of applications 308 entry field is multiplied by 0.17161, a subscriber equipment business unit organization entry field is multiplied by 0.10513, the actual analysis cycle time 322 entry field is multiplied by 0.50631, the alpha testing entry field is multiplied by 20.78681, and other variables are multiplied by 0. Continuing the example, the post-analysis phase model estimates 78 weeks of cycle time for the project, wherein the estimate of 78 weeks of cycle time is more accurate than the previous estimate of 80 weeks of cycle time because the post-analysis phase model is based on the actual analysis cycle time 322 entry field.

In box 708, the models are tested by at least one of a root mean square error method, a coefficient of determination method, and an adjusted coefficient of determination method. The enhanced project predictor 602 can test the models 650 and any sub-models by at least one of these methods that are described in *Basic Business Statistics: Concepts and Applications*. The test for each of these methods and sub-models results in a numerical value for each model and sub-model. The resulting numerical value for each model and sub-model tested by a specific method can be compared to the corresponding numerical values for the other models and sub-models tested by the specific method to determine which model or sub-model is the most accurate model based on the specific method. The enhanced project predictor 602 can also test the models 650 by at least one of these methods while the analyzer 648 analyzes the historical project data to generate models and sub-models for a proposed project in box 706. Testing the models while the analyzer 648 generates models can enable the analyzer 648 to stop generating models or sub-models when each specific method determines which generated model or sub-model is the most accurate model or sub-model based on each of the specific methods.

The root mean square error is the expected value of the square of the "error". The "error" is the amount by which the predicted value differs from the actual value. In an applied example, the root mean square error is equal to 10.56 for one linear sub-model and equal to 7.38 for a linear sub-model measured to be more accurate by the root mean square error method.

The coefficient of determination is based on sample variance, the measure of a predicted value's statistical dispersion indicating how far from the actual value the predicted values typically are. The coefficient of determination is the proportion of the sample variance of the predicted values that are "explained" by predictor variables when a linear regression is done. Predictor variables can represent each of the data entered into the input 302. The coefficient of determination always increases when a new predictor variable is added to a model or sub-model, unless the new predictor variable is perfectly multi-collinear with the original predictor variables. Adding a new predictor variable to the model or sub-model will never decrease the coefficient of determination because the coefficient of determination values the considerations of an accurate model over the considerations of a complex model. When the coefficient of determination equals one or negative one, there is perfect and direct correlation between the predicted values and the actual values. When the coefficient of determination equals zero, there is no correlation between the predicted values and the actual values. In an applied example, the coefficient of determination is equal to 0.71 for one linear sub-model and equal to 0.86 for a linear sub-model measured to be more accurate by the coefficient of determination method.

The adjusted coefficient of determination is a modification of the coefficient of determination that adjusts for the number of predictor variables in a model or sub-model. Unlike the coefficient of determination, the adjusted coefficient of determination increases only if a new predictor variable improves the model or sub-model more than would be expected by chance. In contrast to the coefficient of determination, the adjusted coefficient of determination values a simple model over a complex model, thus balancing the complexity of a model with the accuracy of the model. The adjusted coefficient of determination has the same value range, but will always be less than the coefficient of determination. In an applied example, the adjusted coefficient of determination is equal to 0.66 for one linear sub-model and equal to 0.83 for a linear sub-model measured to be more accurate by the adjusted coefficient of determination method.

In box 710, models are tested by an empirical method. For example, if the user 604 is administrator, the user 604 can utilize the user interface 606 to test the models 650, including sub-models, by using an empirical method. Testing models and sub-models by the empirical method can serve as the basis for the user 604 to select one model or sub-model from the models 650 for the proposed project cycle.

Figure 8:
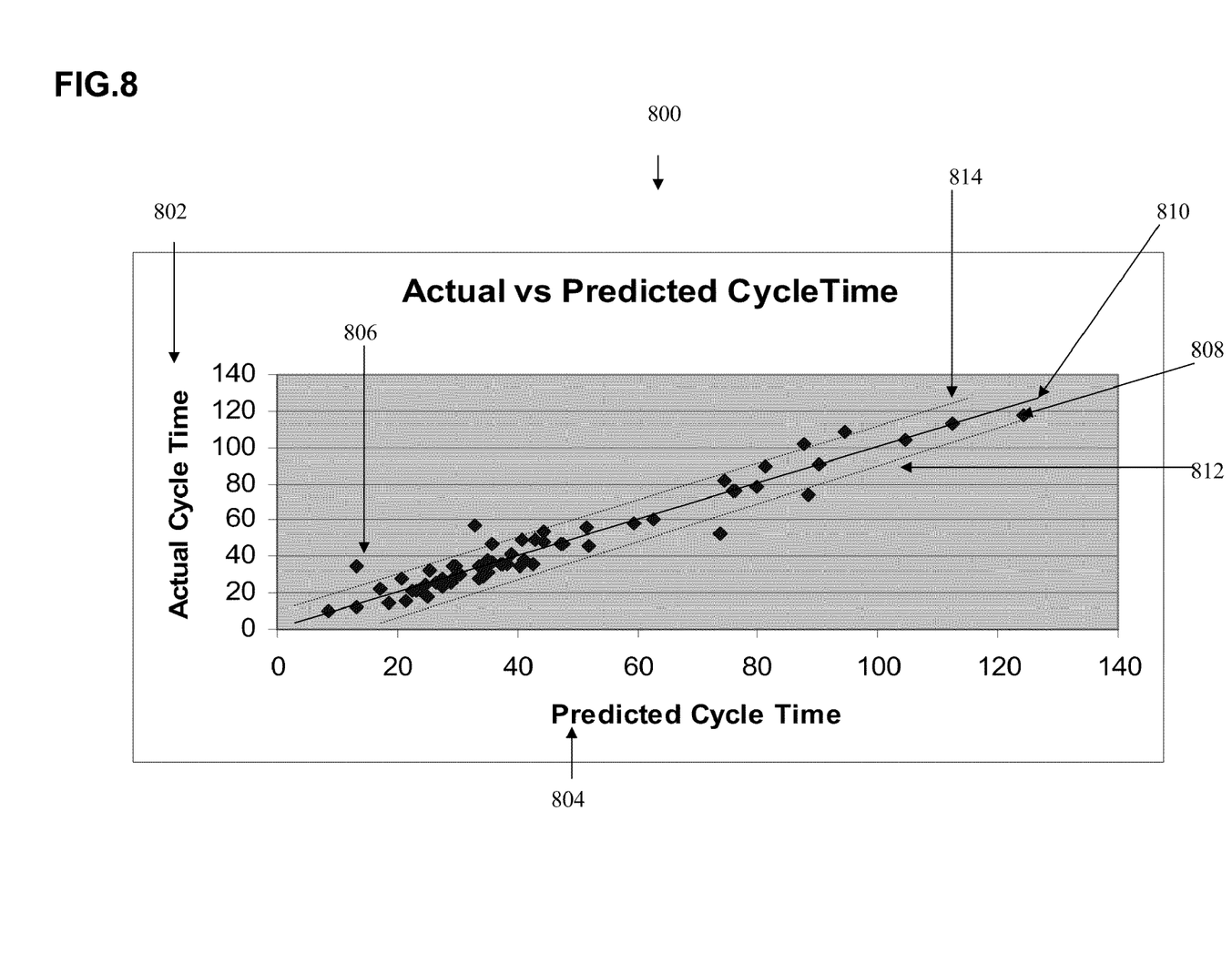
FIG. 8 shows an illustrative enhanced project predictor performance graph according to some embodiments of the present disclosure.

FIG. 8 depicts an example of an illustrative performance graph 800 where the user 604 can test a sub-model by an empirical method, where the user of the graph 800 evaluates whether an actual cycle time 802 for at least 90 percent of the historical data points are within eight weeks of the predicted cycle time 804. The graph 800 depicts the actual cycle time 802 for historical project data on the vertical axis and the predicted cycle time 804 for historical project data on the horizontal axis. The predicted cycle time 804 for historical project data is based on analyzing historical project data to generate models for historical projects, selecting a generated model for historical projects, and applying the historical project data to the selected model to predict the cycle time or cost for each of the historical projects included in the historical project data. The graph 800 provides a comparison of the predicted cycle time 804 and the actual cycle time 802 by depicting historical project data points corresponding to the actual cycle time 802 and the predicted cycle time 804, such as a first data point 806 and a second data point 808. The predicted cycle time 804 for each data point can be based on a linear sub-model. Additionally, the graph 800 depicts a linear equation 810, which represents where the actual cycle time 802 matches the predicted cycle time 804.

Furthermore, the graph 800 depicts lines that are a specified amount of actual cycle time greater than the linear equation 810 and a specified amount of actual cycle time less than the linear equation 810. For example, the first line 812 is equated to the line 810 minus eight weeks of actual cycle time, and the second line 814 is equated to the line 810 plus eight weeks of actual cycle time. The specified amount of actual cycle time can be eight weeks or any other time period. The region between the first line 812 and the second line 814 can be used to test the accuracy of the full prediction model for the project predictor by an empirical method. For example, the historical project data points, such as the second data point 808, that are between the first linear equation 812 and the second linear equation 814 represent where the actual cycle time 802 is within eight weeks of the predicted cycle time 804, represented by the linear equation 810. In another example, the historical project data points, such as the first data point 806, that are outside the first linear equation 812 and the second linear equation 814 represent where the actual cycle time 802 is outside eight weeks of the predicted cycle time 804, represented by the linear equation 810. The empirical method enables the user 604 of the graph 800 to evaluate whether the actual cycle time 802 for a sufficient number of historical data points are within a specified time range of the predicted cycle time 804. For example, the actual cycle time 802 for at least 90 percent of the historical data points in FIG. 8 are within eight weeks of the predicted cycle time 804, represented by the linear equation 810.

In box 712, one model is selected for the proposed project cycle, wherein the selected model can include linear sub-models corresponding to historical data ranges. For example, if the user 604 is an administrator, the user 604 utilizes the user interface 606 to select one previously tested model from the models 650, such as the linear sub-model 610, which corresponds to a historical data range for projects estimated to cost less than or equal to a million and a half dollars. The model for the proposed project can be divided into two linear sub-models, with one data range for projects estimated to cost less than or equal to a million and a half dollars and another data range for projects estimated to cost more than a million and a half dollars. The division of the model into these sub-models can be based upon the identification of a transition data point, such as the transition data point 412 in FIG. 4. The division can be based on the premise that major projects differ from minor projects and based on an observation that multiple linear sub-models generate more accurate predictions than a single model generates for proposed project cycle times and costs.

In box 714, a sub-model is chosen based on the proposed project data, i.e., the linear sub-model corresponding to the data range of the proposed project, and used to predict the cycle time or cost. For example, is the user 604 is a project manager, the user 604 applies the proposed project data 612 entered into the input 302 entry fields to one linear sub-model, such as the linear sub-model 610, of the models 650 to predict the cycle time or cost for the proposed project. Administrators have the capability to test and select models for predicting cycle time or cost, whereas project managers are limited to applying proposed project data to linear sub-models to predict the cycle time or cost. The cycle time or cost for the proposed project can be calculated by multiplying each entry for the proposed project data 612 by the selected model's corresponding parameter for the entry and then summing the products of each multiplication. Continuing this example, the project predictor predicts the predicted cycle time 326 of 28.3 weeks, as depicted in FIG. 3.

In box 716, the proposed project data is stored and later used to update the selected model. For example, when the proposed project is completed, the proposed project data 612 and the actual cycle time and the actual cost for the proposed project are stored by the data manager 608 and used to update the historical project data 610 for use by a subsequent project. This updating of the historical project data 610, combined with the potential purging of the oldest historical project data 610, enables the enhanced project predictor 602 to generate the models 650 based on the most recent relationships between the historical characteristics 616 and the completed project data 614, such as the historical cycle times and the historical costs.

In box 718, the analyzer 648 determines whether the linear sub-model is generated by insufficient historical project data 610. If the analyzer 648 applies the root mean square error method, the coefficient of determination method, or the adjusted coefficient of determination method and determines that the linear sub-model is generated by insufficient historical project data 610, the method continues to box 720. If the analyzer 648 determines that the linear sub-model is not generated by insufficient historical project data 610, the method stops. For example, the analyzer 648 applies at least one of the methods listed above to determine that the linear sub-model corresponds to a data range for only a few historical projects that are estimated to cost more than a million and a half dollars, which the analyzer 648 determines is a sub-model generated by insufficient historical project data 610.

In box 720, the analyzer 648 applies the proposed project data 612 and analysis cycle time to a model to predict the proposed project cycle time. For example, if the listed methods indicate that an insufficient amount of major projects exist for a prediction based on distinct sub-models and distinct data ranges, the analyzer 648 applies the proposed project data 612 and analysis cycle time to a model based on overlapping sub-models and overlapping data ranges. Continuing this example, if only a few historical projects are estimated to cost more than a million and a half dollars, the analyzer 648 applies the proposed project data 612 and analysis cycle time to an overlapping sub-model based on an overlapping data range, the data range that includes both projects estimated to cost more than a million and a half dollars and projects estimated to cost less than a million and a half dollars.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A computer implemented method for project prediction, comprising:
   analyzing historical project data to generate a model for a proposed project cycle time, wherein the model comprises distinct linear sub-models corresponding to distinct historical data ranges, and wherein each of the distinct linear sub-models is generated using multiple regression analysis on historical project data within the corresponding distinct historical data range;
   determining that proposed project data falls within one of the distinct historical data ranges;
   determining that the distinct linear sub-model corresponding to the one of the distinct historical data ranges is generated with insufficient historical project data;
   analyzing historical project data from the one of the distinct historical data ranges and another of the distinct historical data ranges to generate an overlapping linear sub-model in response to determining that the distinct linear sub-model was generated with insufficient historical project data; and
   applying the proposed project data to the overlapping linear sub-model to predict the proposed project cycle time, wherein the proposed project data includes a cycle time for a project analysis phase.

2. The computer implemented method of claim 1 wherein the proposed project data comprises proposed characteristics, and wherein the historical project data comprises historical cycle times and historical characteristics significantly correlated with the historical cycle times.

3. The computer implemented method of claim 2 wherein the proposed characteristics and the historical characteristics comprise at least one of estimated costs, organization participation, a number of applications affected, a project size, a pre-existing project status, and a test plan.

4. The computer implemented method of claim 1 wherein the model is tested by at least one of a root mean square error method, a coefficient of determination method, an adjusted coefficient of determination method, and an empirical method.

5. The computer implemented method of claim 1 wherein the proposed data range is based on an estimated total cost.

6. The computer implemented method of claim 1 wherein the distinct linear sub-model is based on estimated costs, analysis cycle time, a test plan, and organization participation.

7. The computer implemented method of claim 6 wherein the estimated costs are greater than a specified cost and the distinct linear sub-model is further based on a number of applications affected.

8. The computer implemented method of claim 6 wherein the estimated costs are less than a specified cost and the distinct linear sub-model is further based on a pre-existing project status.

9. A computer implemented system for project prediction, comprising:
   an analyzer executable by a processor to analyze historical project data to generate a model that includes mutually exclusive linear sub-models corresponding to mutually exclusive historical data ranges for predicting project cycle times, wherein each of the mutually exclusive linear sub-models is generated using multiple regressing analysis on historical project data within the corresponding mutually exclusive historical data range, and wherein proposed project data falls within one of the mutually exclusive historical data ranges;
   the analyzer further operable to determine that the mutually exclusive linear sub-models corresponding to the one of the mutually exclusive historical data ranges is generated with insufficient historical project data;
   the analyzer further operable to analyze historical data from the one of the mutually exclusive historical data ranges and another of the mutually exclusive historical data ranges to generate an overlapping linear sub-model in response to determining that the mutually exclusive linear sub-model was generated with insufficient historical data; and a user interface executable by a processor to apply the proposed project data including an analysis cycle time to the overlapping linear sub-model to predict a project cycle time.

10. The computer implemented system of claim 9 wherein the proposed project data comprises proposed characteristics, and wherein the historical project data comprises historical cycle times and historical characteristics significantly correlated with the historical cycle times.

11. The computer implemented system of claim 9 wherein the proposed characteristics and the historical characteristics comprise at least one of estimated costs, organization participation, a number of applications affected, a project size, a pre-existing project status, and a test plan.

12. The computer implemented system of claim 9 wherein the analyzer is further operable to test models by at least one of a root mean square error method, a coefficient of determination method, an adjusted coefficient of determination method, and an empirical method.

13. A computer implemented method for project prediction, comprising:
    analyzing historical project data to generate a mode for a proposed project cost, wherein the model comprises non-overlapping linear sub-models corresponding to non-overlapping historical data ranges, wherein each of the non-overlapping linear sub-models is generated using multiple regression analysis on historical project data within the corresponding non-overlapping historical data range;
    determining that proposed project data falls within one of the non-overlapping historical data ranges;
    determining that the non-overlapping linear sub-model corresponding to the one of the non-overlapping historical data ranges is generated with insufficient historical project data;
    analyzing historical project data from the one of the non-overlapping historical data ranges and another of the non-overlapping historical data ranges to generate an overlapping linear sub-model in response to determining that the non-overlapping linear sub-model was generated with insufficient historical project data; and
    applying the proposed project data and an analysis cycle time to the overlapping linear sub-model to predict the proposed project cost.

14. The computer implemented method of claim 13 wherein the proposed project data comprises proposed characteristics, and wherein the historical project data comprises historical costs and historical characteristics significantly correlated with the historical costs.

15. The computer implemented method of claim 14 wherein the proposed characteristics and the historical characteristics comprise at least one of estimated costs, organization participation, a number of applications affected, a project size, a pre-existing project status, and a test plan.

16. The computer implemented method of claim 13 wherein the model is selected for the proposed project cost by testing the model using at least one of a root mean square error method, a coefficient of determination method, and an adjusted coefficient of determination method, and an empirical method.

17. The computer implemented method of claim 12 wherein the mutually exclusive linear sub-model corresponding to the one of the mutually exclusive historical ranges is determined to be generated with insufficient historical project data by applying one of a root mean square error method, a coefficient of determination method, or an adjusted coefficient of determination method.

18. The computer implemented method of claim 1 wherein the distinct linear sub-model corresponding to the one of the distinct historical ranges is determined to be generated with insufficient historical project data by applying one of a root mean square error method, a coefficient of determination method, or an adjusted coefficient of determination method.

19. The computer implemented method of claim 1 wherein the other of the distinct historical data ranges is adjacent to the one of the distinct historical data ranges.

20. The computer implemented system of claim 9 wherein the non-overlapping linear sub-model corresponding to the one of the non-overlapping historical ranges is determined to be generated with insufficient historical project data by applying one of a root mean square error method, a coefficient of determination method, or an adjusted coefficient of determination method.

* * * * *